(12) United States Patent  
Prater (10) Patent No.: US 6,490,138 B1  
(45) Date of Patent: Dec. 3, 2002

(54) MULTIPLE ACTUATOR PIVOT BEARING

(75) Inventor: Walter L. Prater, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 09/651,440

(22) Filed: Aug. 30, 2000

(51) Int. Cl.[7] .............................................. G11B 5/55
(52) U.S. Cl. .................................................. 360/294.3
(58) Field of Search ........................... 360/265.2, 265.4, 360/265.6, 294.3, 294.6, 264.4

(56) References Cited

U.S. PATENT DOCUMENTS

| 4,150,407 A | 4/1979 | Diikstra |
| 4,544,972 A | 10/1985 | Kogure et al. |
| 4,701,818 A | * 10/1987 | Gitzendanner ............. 360/106 |
| 5,134,532 A | 7/1992 | Svendsen et al. |
| 5,761,007 A | 6/1998 | Price et al. |
| 5,805,386 A | 9/1998 | Faris |
| 5,828,521 A | 10/1998 | Hasegawa |
| 5,914,837 A | 6/1999 | Edwards et al. |
| 5,930,071 A | 7/1999 | Back |

FOREIGN PATENT DOCUMENTS

| JP | 6278783 A | 4/1987 |
| JP | 62232776 A | 10/1987 |
| JP | 01048271 A | 2/1989 |
| JP | 01057463 A | 3/1989 |
| JP | 02139772 A | 5/1990 |
| JP | 4360077 A | 12/1992 |
| JP | 06076307 A | 3/1994 |
| JP | 10097769 A | 4/1998 |

* cited by examiner

Primary Examiner—Robert S. Tupper  
(74) Attorney, Agent, or Firm—Raymond E. Roberts; Intellectual Property Law Offices (57) ABSTRACT

A split shaft assembly for vibration control between multiple actuator pivots in a disk storage device. A first actuator pivot is mounted on a first shaft unit and a second actuator pivot is mounted on a second shaft unit. The second shaft unit is mated to the first shaft unit in axial alignment along a common pivot axis by a separating portion of a vibration control material, which interrupts transmission of vibrational force between the first actuator pivot and the second actuator pivot.

17 Claims, 9 Drawing Sheets

MULTIPLE ACTUATOR PIVOT BEARING

BACKGROUND OF THE INVENTION

1. Field of the Invention

The present invention relates to the manufacture of disk storage devices. More particularly, the invention is directed to an apparatus and method for vibration control between multiple actuators as are commonly used in such storage devices.

2. Description of the Background Art

Disk storage devices are well known in the industry today. Many versions exist, with the most widely used probably being magnetic disk storage devices termed "hard drives" or "fixed disk drives." In these, one or more disks coated with a magnetic storage media are rotated and data is written to and read from the media with read/write heads pivotally mounted on actuator assemblies. Optical and other types of disk storage devices are also known or possible, and it should clearly be appreciated that the present invention may improve many embodiments of these as well, but for exemplary purposes the present discussion will primarily be directed to magnetic disk storage devices.

Modern disk storage devices often have a number of competing design goals. Without limitation, these may include reliability, accuracy, small size, high storage density, and high data access and transfer speeds. A key portion of a disk storage device may thus be the pivot or actuator assembly or assemblies which position read/write heads over the storage media. Traditionally, single pivot assemblies have primarily been used, but multiple pivot assembly systems are also known, and in seeking to reach various of the competing design goals the industry is now turning to multiple pivot assembly systems, particularly dual pivot assembly systems.

Unfortunately, aside from the obvious additional mechanical complexity, multiple pivotal actuator assemblies introduce a number of additional problems for the designers of disk storage devices. Of present interest are how they create, transfer, and are effected by vibration. Before turning to a discussion of this, however, a brief summary of the state of the prior art may by useful.

Vibration is a problem even in single pivot assembly systems. U.S. Pat. No. 5,930,071 by Black teaches a rubber-like material to dampen vibrations at the bearings and the shaft at which the single actuator assembly pivots. Japanese Pat. No. 2-139772 by Hidehiro teaches a single pivot assembly wherein the shaft has an elastic core into which a screw extends to hold the shaft in place. And Japanese Pat. No. 1-048271 by Hiroshi teaches a vibo-elastic material on an outer circumference to reduce vibration from the device housing effecting a single carriage.

In notable contrast, when the industry has turned to dual pivot assembly systems it has essentially ignored the problem vibration control, or worked around it using basic design methodologies not germane to this discussion. U.S. Pat. No. 4,544,972 by Kogure et al. and Japanese Pat. No. 62-78783 also by Kogure teach dual actuator assemblies without vibration dampening or isolation. U.S. Pat. No. 5,761,007 by Price et al. also teaches multiple actuators, and it even uses a elastometric sleeve. But this sleeve is merely part of a crash stop against which an actuator stops its pivotal motion in one direction, rather than any manner of vibration control. Thus multiple pivot assembly systems with vibrations control remain something unknown in the art.

As described, traditional multiple actuator designs have a dual pivot with a single shaft. Unfortunately, the conventional single shaft used provides a transmission path for vibration to travel between the respective actuators. Since the use of multiple actuators is generally a straight forward extension of the principles for dual actuators, the dual actuator case will primarily be discussed herein.

Figure 1:
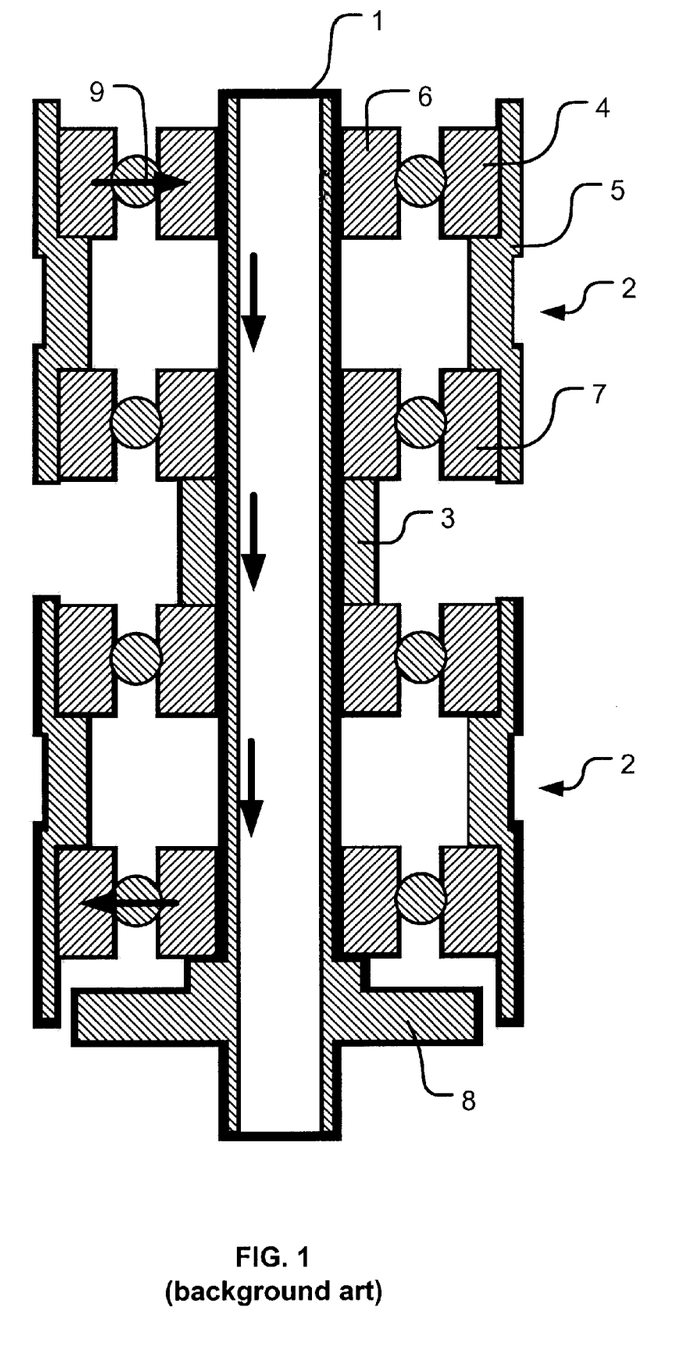
FIG. 1 (background art) is a side broken view of dual actuator bearing assemblies mounted on a conventional single common shaft.

FIG. 1 (background art) is a side broken view of bearing assemblies for dual actuators mounted on a single shaft, as might be found in the prior art. A common shaft 1 is provided which is mounted within a disk storage device housing (not shown). Respective bearing assemblies 2, one per actuator, are mounted on the common shaft 1, typically spaced apart by a separation maintainer 3 (e.g., a spacer or bushing) as shown in FIG. 1.

The bearing assemblies 2 each include two bearings 4 which are mounted in a sleeve 5 of the actuator (also not otherwise shown). Specifically, in the embodiment shown in FIG. 1, the bearings 4 include inner races 6 and outer races 7. The bearings 4 depicted in FIG. 1 are ball-type bearings, but roller-types and, at least in theory, other types of bearings may also be employed.

As can be seen in FIG. 1, the outer races 7 of the bearings 4 are fixedly mounted in the sleeves 5 of the respective actuators, and the inner races 6 of the bearings 4 are fixedly mounted on the common shaft 1. FIG. 1 also depicts one common arrangement, wherein the inner race 6 of the lower-most bearing 4 in the bottom bearing assembly 2 abuts against a base flange 8 of the common shaft 1. The separation maintainer 3 then abuts against the top-most inner race 6 of the bottom bearing assembly 2 as well as against the lower-most inner race 6 of the upper bearing assembly 2. In this manner, when the media disk in a disk storage device is oriented to revolve in a horizontal plane, the actuators are horizontally pivotally mounted and vertically fixedly mounted on the common shaft 1.

Unfortunately, this arrangement provides a transmission path for vibration between the respective actuators. In FIG. 1, path arrows 9 stylistically depict the paths for vibrational force from the upper actuator into the lower actuator. When vibration occurs in the upper actuator, for instance, it may travel through the upper sleeve 5 and the bearings 4 into the common shaft 1 and the separation maintainer 3 (in embodiments where one is used), and from these into the lower bearings 4 and sleeve 5 of the lower actuator. In this manner, vibration occurring in one actuator has a continuous transmission path to any other actuators mounted on the common shaft 1.

In practice, since both the upper and lower actuators move separately, vibration can be generated in both and interact complexly to effect actuator-mounted device operation, such as that of data read/write heads. It should also be appreciated that vibration inherently has time and frequency related components. Vibrational energy present at a first instant in time may be stored, somewhat, and have an effect at a later second instant in time. Vibrational energy may also be generated, transferred, and absorbed differently depending upon its frequency and its relationship to the resonant and harmonic frequencies of the physical structures which are present.

This can cause particularly undesirable results. For example, a common use of multiple actuators is to separate track following and seeking functions in a magnetic disk storage device such as a computer hard drive. Vibrations occurring in the seeking actuator can travel to the tracking actuator and can cause heads mounted on it to go off course.

Alternately, vibrations from the tracking actuator can cause an increase in the settle time for the seeking actuator. Or vibrations created in an actuator at one instant can travel outward, elsewhere into the entire storage assembly, and be reflected back at a later time to adversely effect the operation of the same actuator.

The preceding is not an exhaustive list of all possible vibro-mechanical interactions, but it is enough to demonstrate that disk storage devices are quite complex structures and that designers of them do not have an easy task. If disk storage device design is to continue to evolve, using increasing numbers of mechanical subassemblies operating separately and in concert at increasing speeds, systems are sorely needed for vibration control. Accordingly, an object of the present invention is to provide apparatus and method for vibration control between multiple actuators in disk storage devices. Other objects and advantages will become apparent from the following disclosure.

SUMMARY OF THE INVENTION

The present invention relates to split shaft assemblies for vibration control between multiple actuator pivots in a disk storage device. A first actuator pivot is mounted on a first shaft unit and a second actuator pivot is mounted on a second shaft unit. The second shaft unit is mated to the first shaft unit in axial alignment along a common pivot axis by a separating portion of a vibration control material, which interrupts transmission of vibrational force between the first actuator pivot and the second actuator pivot.

A more through disclosure of the present invention is presented in the detailed description which follows and the accompanying figures.

BRIEF DESCRIPTION OF THE DRAWINGS

The objects and, advantages and features of the present invention will be more clearly understood by reference to the following detailed disclosure and the accompanying drawings in which.

DETAILED DESCRIPTION OF THE INVENTION

The present invention relates to split shaft assemblies for vibration control between multiple actuator pivots, as may be commonly used in a disk storage device.

A preferred embodiment of the present invention is a split shaft assembly employing a vibration control material. As illustrated in the various drawings herein, and particularly the views of FIGS. 2–7, some exemplary embodiments of the present invention are collectively depicted by the general reference character 10.

Figure 2:
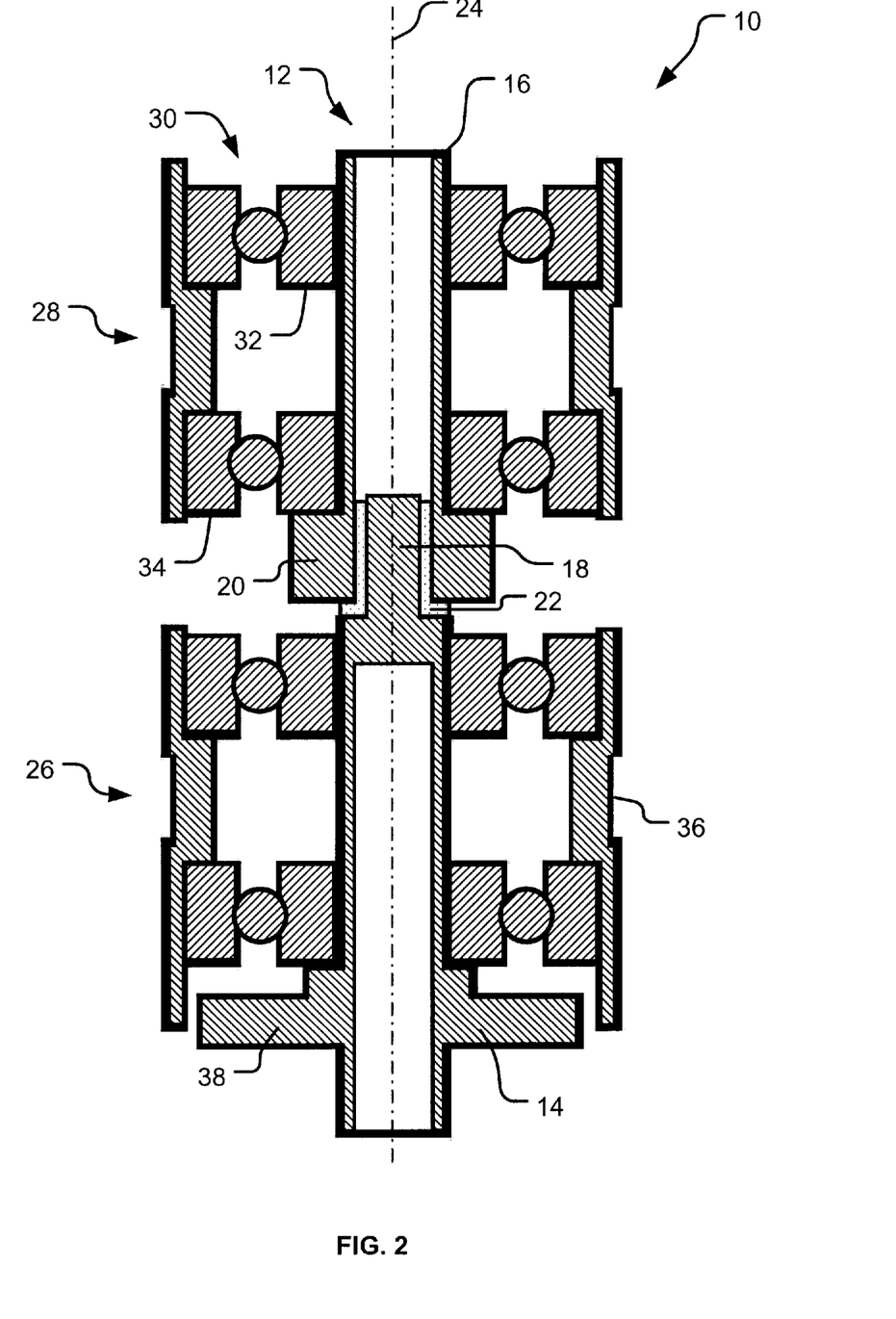
FIG. 2 is a side broken view of dual actuator bearing assemblies mounted on a split shaft mated together with a boss and flange, in accordance with one embodiment of the present invention.

Turning now to FIG. 2, a side broken view is shown of one pivot assembly 10 according to the present invention. A split shaft assembly 12 includes a bottom shaft unit 14 and a top shaft unit 16. The bottom shaft unit 14 includes a boss 18 and the top shaft unit 16 includes a flange 20. The bottom shaft unit 14 and the top shaft unit 16 are mated together in male-to-female manner by insertion of the boss 18 into the flange 20, but with a layer of vibration control material 22 preventing actual physical contact between any potions of the boss 18 and the flange 20 or directly between the bottom shaft unit 14 and the top shaft unit 16. The extent to which the boss 18 is inserted into the flange 20, i.e., into a hollowed out interior of the top shaft unit 16, provides desirable stiffness to the split shaft assembly 12 as a whole in the axial and bending directions.

In particular, the bottom shaft unit 14, the top shaft unit 16, and the entire split shaft assembly 12 share a common pivot axis 24 about which essentially conventional actuator assemblies (or "pivot assemblies") may be provided. As shown in FIG. 2, a bottom actuator assembly 26 may be mounted on the bottom shaft unit 14 and a top actuator assembly 28 may be mounted on the top shaft unit 16. These actuator assemblies 26, 28 each include bearings 30 having inner races 32 and outer races 34. The bearings 30 are further mounted into sleeves 36 of the respective actuator assemblies 26, 28.

In the particular variation shown in FIG. 2, the bottom shaft unit 14 includes a base flange 38 against which the inner race 32 of the bottom bearing 30 in the bottom actuator assembly 26 abuts. As noted, the top shaft unit 16 includes the flange 20, and the inner race 32 of the lower bearing 30 in the top actuator assembly 28 abuts against this. In this manner, this embodiment may dispense with the separation maintainer 3 of FIG. 1 (background art). This is often highly desirable because space between the bottom actuator assembly 26 and the top actuator assembly 28 can be very constrained. The spacing shown in FIG. 2 is somewhat exaggerated compared to what will be the case in many embodiments, with the flange 20 shown for illustrative purposes as being much thicker than it typically needs to be.

The vibration control material 22 plays a particularly important role in all embodiments of the pivot assembly 10. It may be selected for its ability to isolate the bottom shaft unit 14 and the top shaft unit 16 from vibrations, or it may be selected for its ability to dampen passing vibrations, or it may selected to provide varying degrees of isolation and dampening concurrently.

Without limitation, some representative examples of materials for use as the vibration control material 22 are urethanes, particularly moldable ones, and acrylics. The urethanes, and other synthetic "rubbers," can be particularly stiff and have useful isolating characteristics, while acrylics can have useful dampening characteristics.

One interesting material is epoxy. Not all epoxies are stiff or harden to brittleness, particularly at the typical operating temperatures in disk storage devices (e.g., 65 degrees centigrade). Thus, essentially all polymers have some potential for use as the vibration control material 22.

The vibration control material 22 in FIG. 2 has been described above as a "layer" and is shown filling the entire region between the boss 18 and the flange 20 portions of the bottom shaft unit 14 and the top shaft unit 16. This will likely be the case in most embodiments, but it should be appreciated that these are not requirements. The vibration control material 22 separates the bottom shaft unit 14 and the top shaft unit 16, but its shape and the quantity used can vary.

Figure 3:
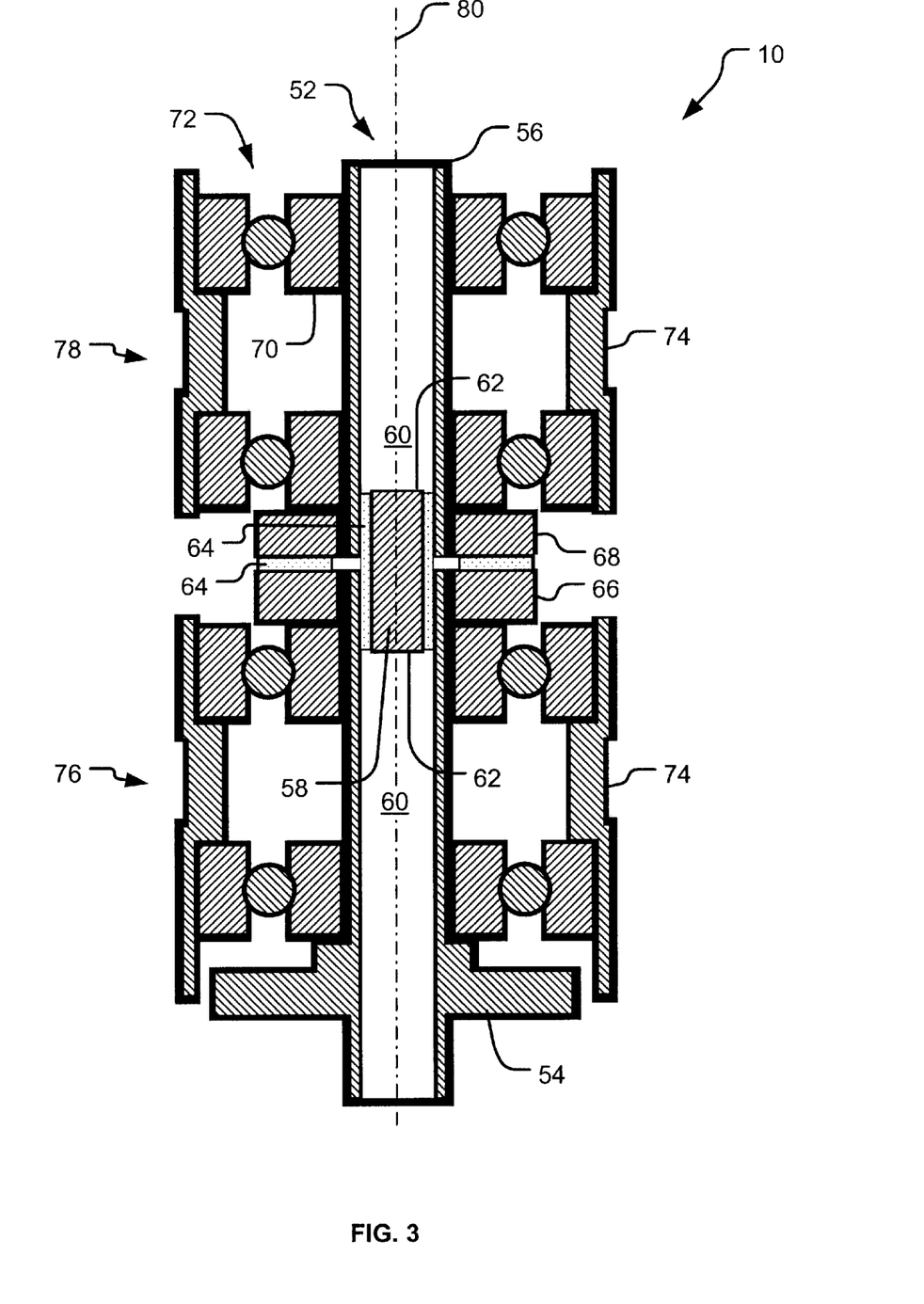
FIG. 3 is a side broken view of dual actuator bearing assemblies mounted on a split shaft mated together with an internal post, in accordance with another embodiment of the present invention.

Turning now to FIG. 3, a side broken view of a different pivot assembly 10 is depicted there. A split shaft assembly 52 is provided which includes a bottom shaft unit 54, a top shaft unit 56, and a post 58. Both the bottom shaft unit 54 and the top shaft unit 56 have recesses 60 suitable for receiving one of respective ends 62 of the post 58. The post 58 is prevented from actual physical contact with the shaft units 54, 56 by a layer of vibration control material 64 (which may be essentially the same as that described for the embodiment in FIG. 2).

In FIG. 3 the shaft units 54, 56 are both depicted as being hollow. This is not a requirement but may be motivated by the same reasons that conventional single, common shafts are usually hollow, to save material and to reduce weight. Being hollow here, however, also conviently provides the recesses 60.

While using the post 58 alone may serve to provide the split shaft assembly 52 with adequate stiffness, FIG. 3 also shows how optional bushings may increase these characteristics and provide other benefits.

A lower bushing 66 may be provided at the upper end of the bottom shaft unit 54 and an upper bushing 68 may be provided at the lower end of the top shaft unit 56. These may be press fit on or they may be loose, and the upper bushing 68 may even be made an integral part of the top shaft unit 56. These bushings 66, 68 may also abut against inner races 70 of bearings 72 in sleeves 74 of a bottom actuator assembly 76 and a top actuator assembly 78, although this is not a requirement when bushings are used. However, as shown, vibration control material 64 is provided to separate such bushings 66, 68 when they are present. This vibration control material 64 may be the same as that used at the post 58 or it may be different. This is a matter of design choice. But, for example, it may be a useful way to control two particular different sets of vibration frequencies concurrently.

Much as was the case for FIG. 2, the vibration control material 64 can be a layer and fill entire regions or it may be shaped differently and used more sparingly. The thickness of the bushings 66, 68 shown in FIG. 3 is also somewhat exaggerated for illustrative purposes compared to that which is likely to be necessary.

In summary, the versions of this embodiment, with or without the use of the bushings 66, 68, provides adequate stiffness in the axial and bending directions and facilitates maintaining a common pivot axis 80.

Figure 4:
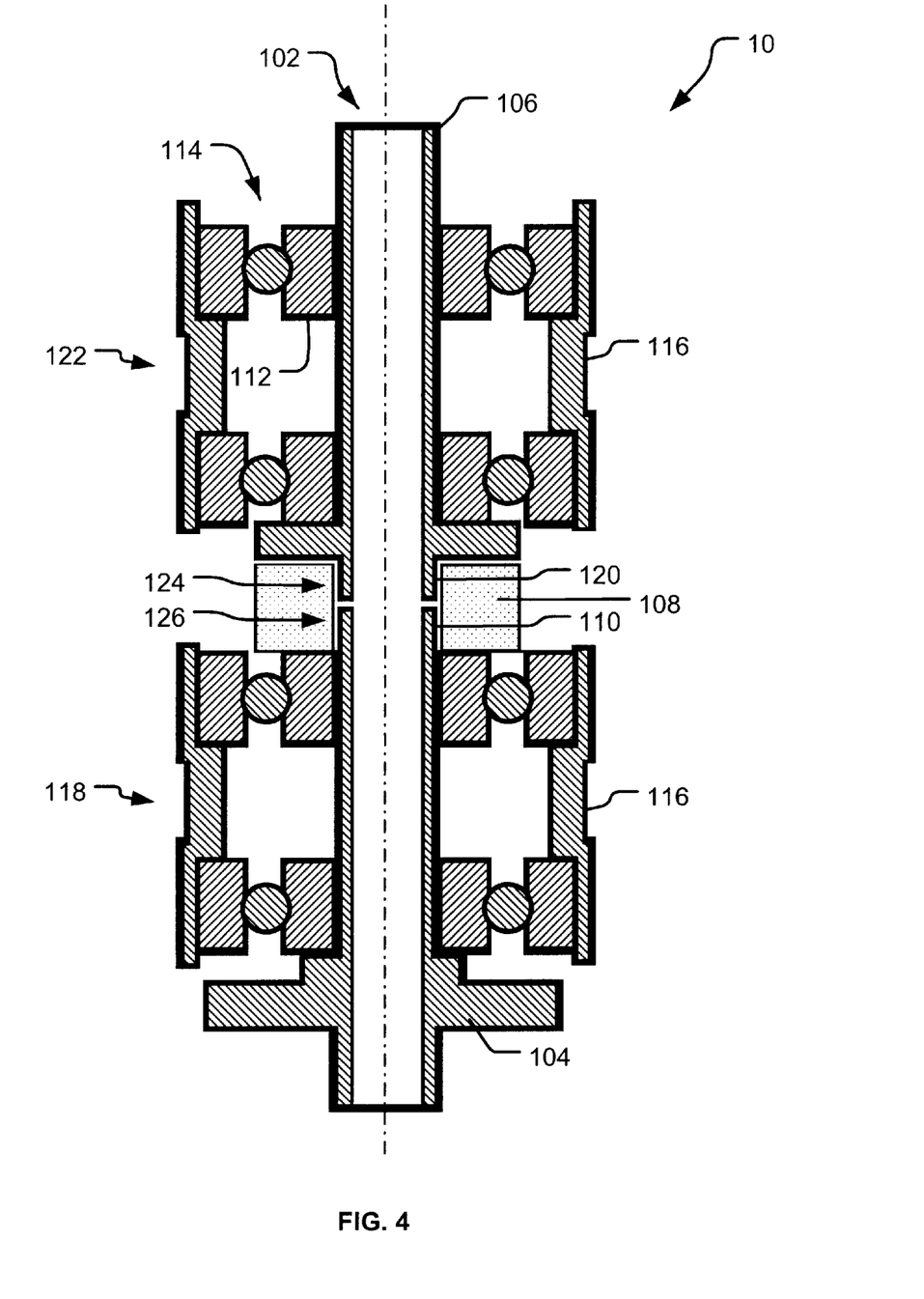
FIG. 4 is a side broken view of dual actuator bearing assemblies mounted on a split shaft mated together with a spacer ring, in accordance with yet another embodiment of the present invention.

Turning now to FIG. 4, it is a side broken view of yet a different pivot assembly 10. A split shaft assembly 102 is provided which includes a bottom shaft unit 104, a top shaft unit 106, and a spacer 108 which is made of a vibration control material.

The bottom shaft unit 104 has an upper end 110 which extends past an inner race 112 of an upper bearing 114 in a sleeve 116 of a bottom actuator assembly 118. The top shaft unit 106 has a lower end 120 which extends past the inner race 112 of a lower bearing 114 in the sleeve 116 of a top actuator assembly 122.

The spacer 108 has a coaxial top opening 124 and bottom opening 126. These may be part of one common bore, as shown, or they simply may separate recesses. The upper end 110 of the bottom shaft unit 104 nests into the bottom opening 126 of the spacer 108 and the lower end 120 of the top shaft unit 106 nests into the top opening 124 of the spacer 108. The bottom of the spacer 108 abuts against the inner race 112 of the upper bearing 114 in the bottom actuator assembly 118. The top of the spacer 108 may simply abut against the inner race 112 of the upper bearing 114 in the top actuator assembly 122. Alternately, as shown in FIG. 4, an optional flange 128 may be provided near the lower end 120 of the top shaft unit 106 and the spacer 108 may abut against that flange 128.

Figure 5:
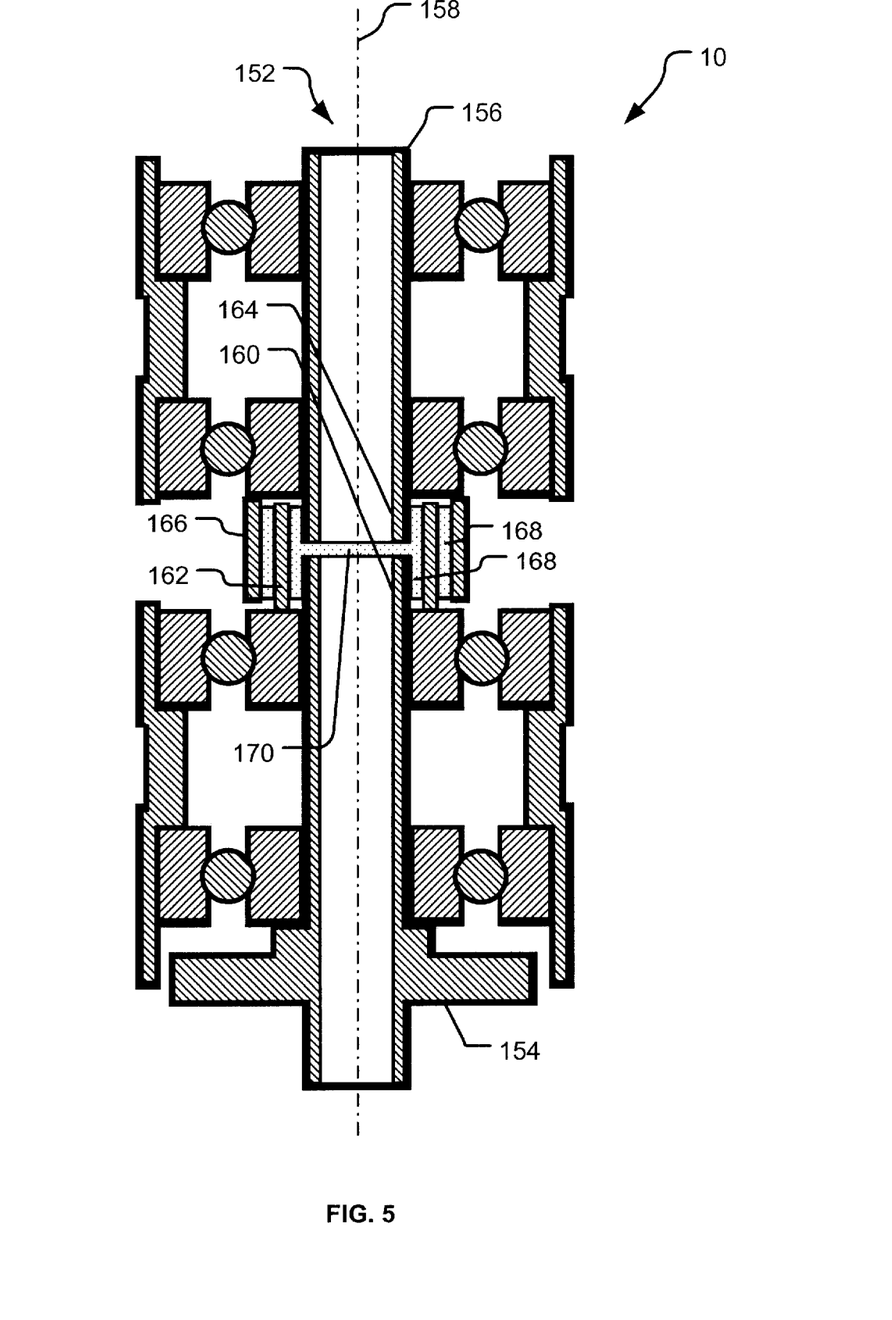
FIG. 5 is a side broken view of dual actuator bearing assemblies mounted on a split shaft mated together with concentric bushings, in accordance with yet another embodiment of the present invention.

FIG. 5 is a side broken view of still a different pivot assembly 10. A split shaft assembly 152 is provided which includes a bottom shaft unit 154 and a top shaft unit 156. When assembled, the split shaft assembly 152 and many of its components share a common pivot axis 158. A top end 160 of the bottom shaft unit 154 has a first concentric bushing 162 and a bottom end 164 of the top shaft unit 156 has a second concentric bushing 166 which is axially offset differently than the first concentric bushing 162. The bottom shaft unit 154 and the top shaft unit 156 are assembled into the split shaft assembly 152 by inter-nestingly engaging the concentric bushings 162, 166 with a separating layer of vibration control material 168. Optionally, as shown, the vibration control material 168 may also fill a gap 170 present between the top end 160 of the bottom shaft unit 154 and the bottom end 164 of the top shaft unit 156.

Figure 6:
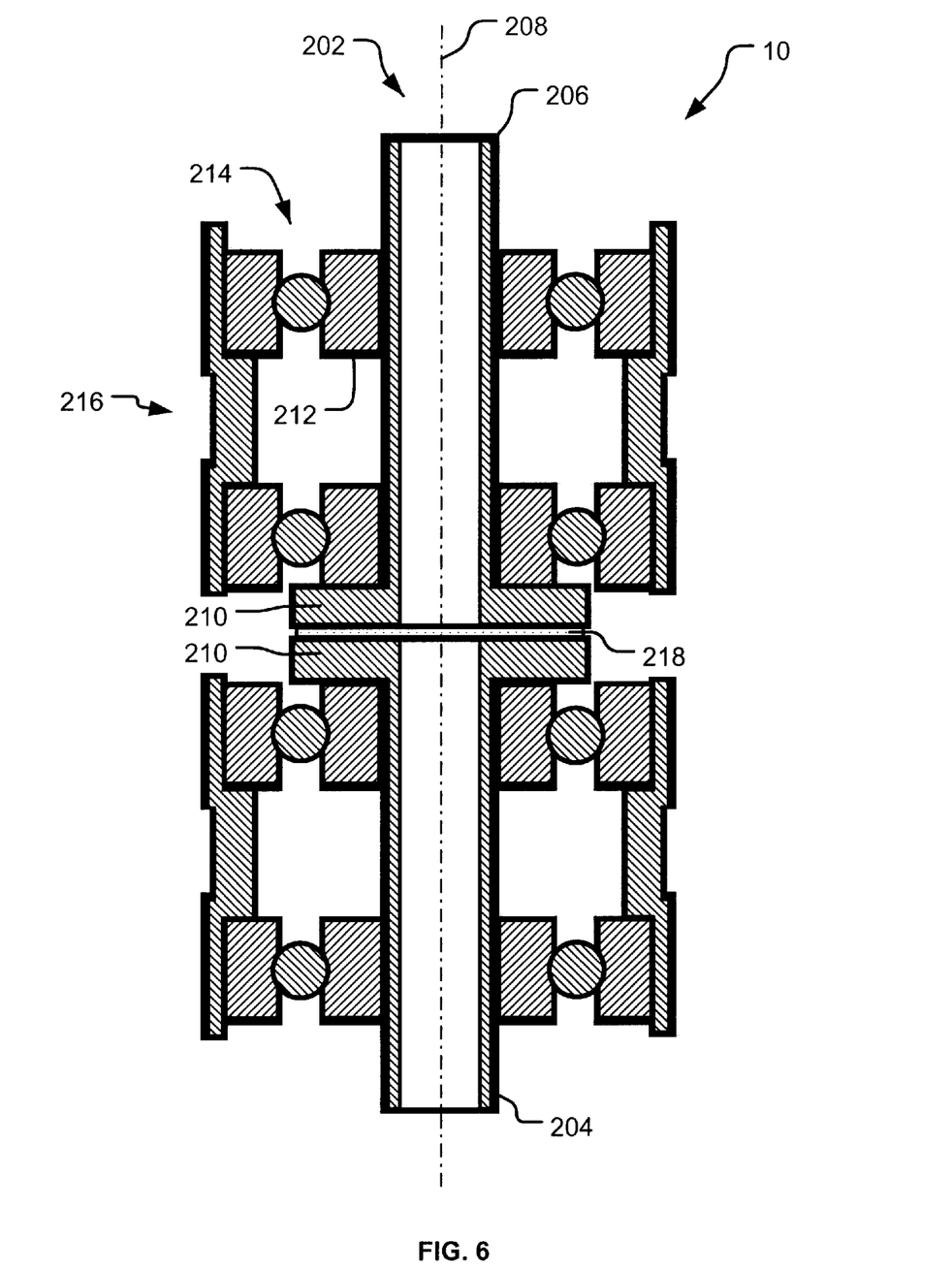
FIG. 6 is a side broken view of dual actuator bearing assemblies mounted on a split shaft mated together with adhesively connected flanges, in accordance with yet another embodiment of the present invention.

FIG. 6 is a side broken view of another pivot assembly 10. A split shaft assembly 202 is provided which includes a bottom shaft unit 204 and a top shaft unit 206, all having a common pivot axis 208 when assembled. The shaft units 204, 206 each have a respective flange 210 at one end and may, as shown, be the same part but oriented differently when assembled. One benefit of using exactly the same part in this manner is reducing the variety of parts which must be stocked, and this the potential cost of disk storage units.

The inner races 212 of bearings 214 in actuator assemblies 216 abut against the flanges 210 on one side, and the opposite sides of the flanges 210 are engaged by a layer of vibration control material 218 which has adhesive properties in addition to vibration control properties. In this manner, the split shaft assembly 202 as a whole has desired stiffness in the axial and bending directions and maintains the common pivot axis 208.

Figure 7:
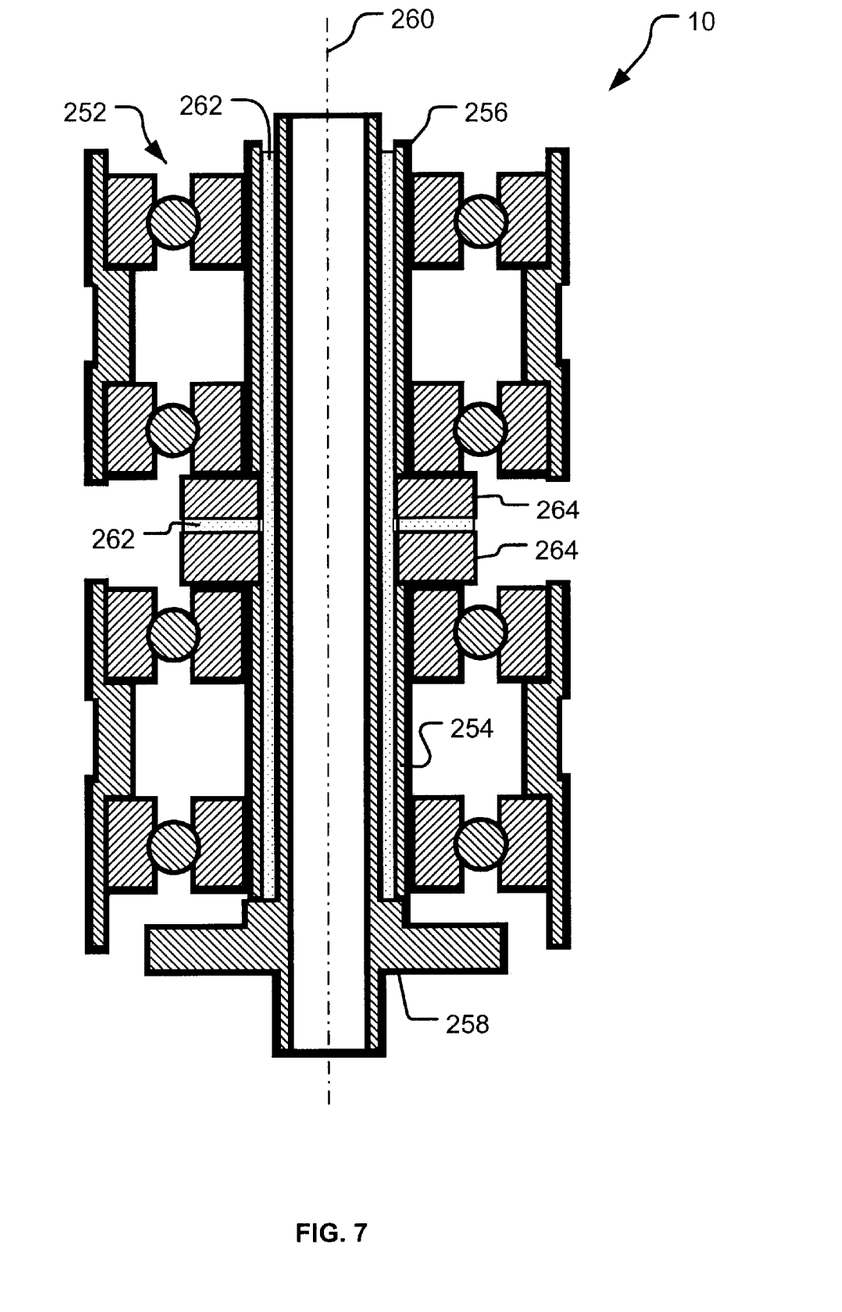
FIG. 7 is a side broken view of dual actuator bearing assemblies mounted on a split outer shaft units mounted on a common inner shaft, in accordance with yet another embodiment of the present invention.

FIG. 7 is a side broken view of yet another pivot assembly 10. A split shaft assembly 252 is provided here which includes a hollow bottom shaft unit 254, a hollow top shaft unit 256, and a common inner shaft 258, again all having a common pivot axis 260 when assembled. The shaft units 254, 256 are mounted on the common inner shaft 258, but separated from direct contact with it by a vibration control material 262.

Conceptually, the embodiment of FIG. 7 may be viewed as a version of the embodiment of FIG. 3 wherein the post 58 is taken to an extreme to become the common inner shaft 258. As was the case in FIG. 3, where optional bushings 66, 68 where shown, the embodiment in FIG. 7 may optionally also employ bushings 264 to yet further provide desired stiffness in the axial and bending directions and to maintain the common pivot axis 260.

Figure 8A:
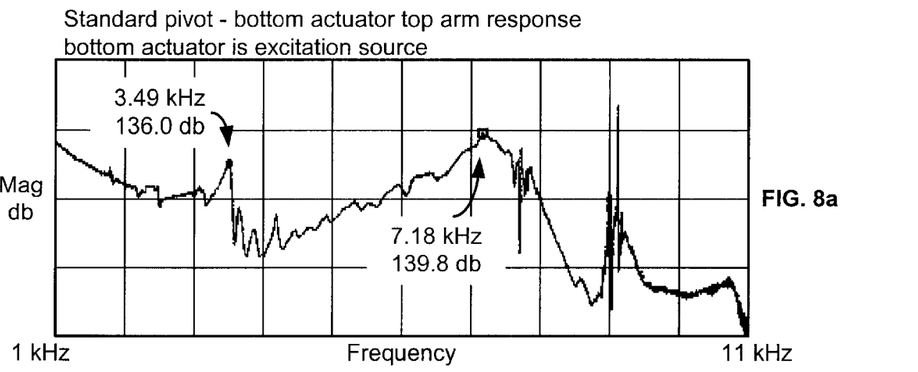
FIGS. 8a–c (prior art) are performance graphs of respective arm responses for a standard common shaft pivot assembly.
Figure 8B:
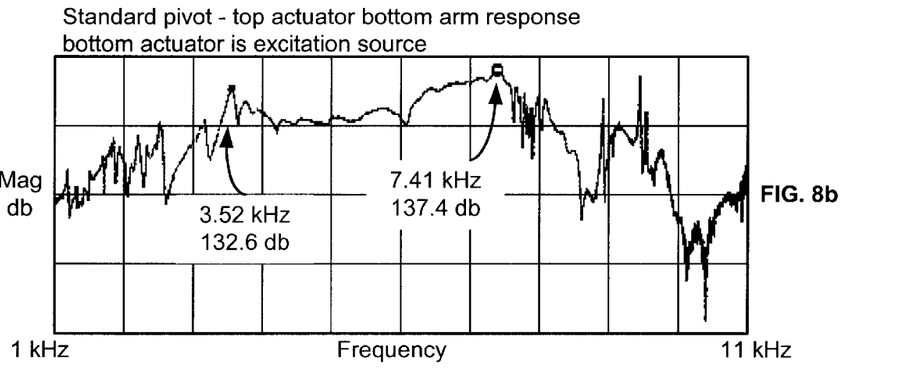
Figure 8C:
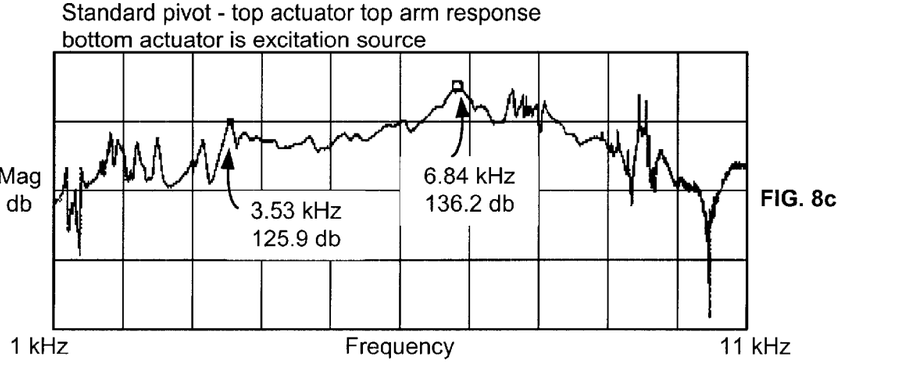
Figure 9A:
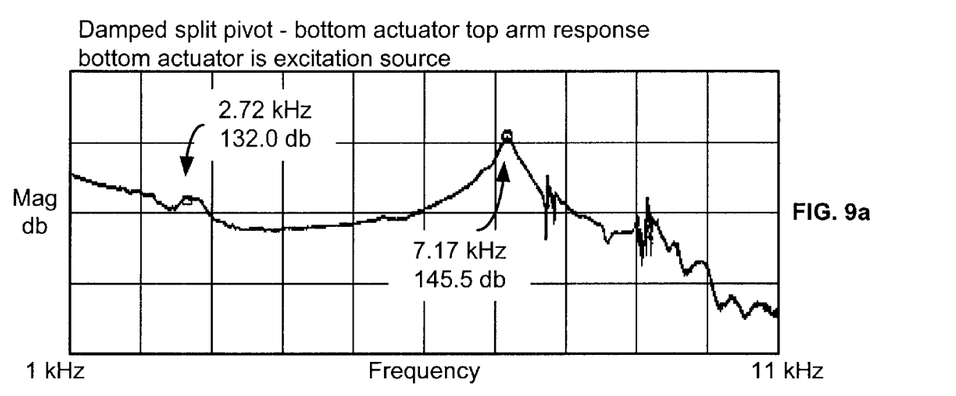
FIGS. 9a–c are performance graphs of respective arm responses for a pivot assembly according to the embodiment of the present invention depicted in FIG. 6.
Figure 9B:
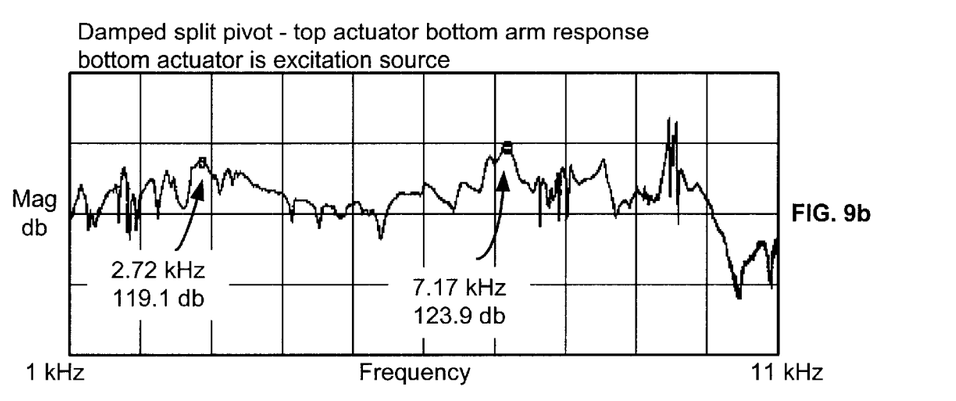
Figure 9C:
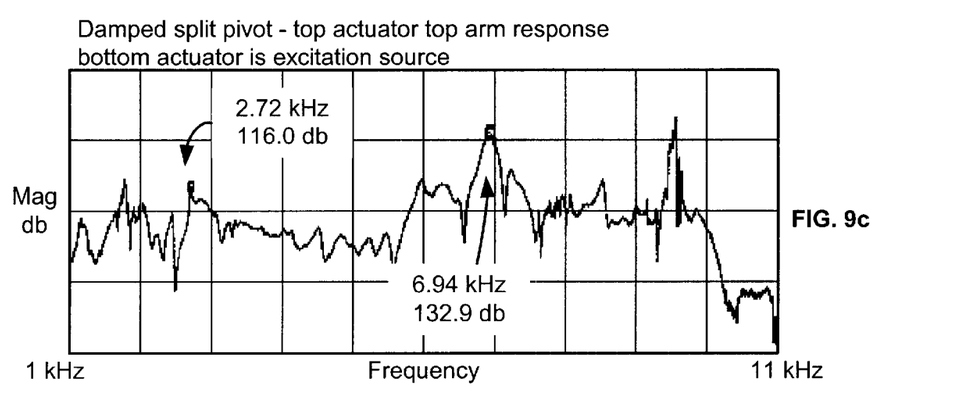

FIGS. 8a–c (prior art) and FIGS. 9a–c are performance graphs of arm response for both a standard common shaft pivot assembly the pivot assembly 10 of FIG. 6. Upper and lower range peaks are particularly noted in each graph.

In FIGS. 8a and 9a the graphs depict the response at the top arm on a bottom actuator when the bottom actuator is the excitation source. In the lower range, the prior art system peaks at 3.49 kHz and 136.0 dB, while the inventive pivot assembly 10 peaks at 2.72 kHz and 132.0 dB. In the higher range, the prior art system peaks at 7.18 kHz and 139.8 dB, while the inventive pivot assembly 10 peaks at 7.17 kHz and 145.5 dB. Two particular conclusions can be drawn here.

Firstly, there are differences in the peak frequencies and these may be beneficially employed. This may not be immediately appreciated by those used to dealing with prior art systems, since peak frequencies in such are dependent on the rigid parts used and any degree of control is considerably harder to accomplish. However, in the pivot assembly 10 the choice and application of the vibration control material 218 can easily be used to specifically control peak frequencies, e.g., to avoid resonant or harmonic frequencies.

Secondly, the peak amplitudes of the respective systems are notably different. In the lower range, the pivot assembly 10 has a clear 4 dB advantage. In the higher range, however, the peak values taken alone can be deceptive. While the pivot assembly 10 might appear to suffer a 5.7 dB disadvantage, the graph in FIG. 9a is much smoother and the argument can be made that the numbers in FIG. 8a are not actually those of the true high range peak (if one notes the spike at 9 kHz). Based on the overall performances depicted, most designers would prefer that depicted in FIG. 9a over that in FIG. 8a.

In FIGS. 8b and 9b the graphs depict responses at the bottom arm of the top actuator when the bottom actuator is again the excitation source. In both the lower and upper ranges, the inventive pivot assembly 10 exhibits striking 13.5 dB advantages, as well as smoother overall response curves.

In FIGS. 8c and 9c the graphs depict responses at the top arm of the top actuator when the bottom actuator is yet again the excitation source. In the respective lower and upper ranges, the pivot assembly 10 exhibit clear 9.9 and 3.3 dB advantages.

In sum, as FIGS. 8a–c and 9a–c demonstrate, the inventive pivot assembly 10 has preferable performance criteria over the prior art system and its prompt acceptance and use by the industry can be anticipated.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

What is claimed is:

1. A split shaft assembly for vibration control between a first actuator pivot and a second actuator pivot in a disk storage device, comprising:
 a first shaft unit, wherein the first actuator pivot is mounted on said first shaft unit;
 a second shaft unit, wherein the second actuator pivot is mounted on said second shaft unit; and
 said second shaft unit is mated to said first shaft unit in axial alignment along a common pivot axis by a separating portion of a vibration control material, to interrupt transmission of vibrational force between the first actuator pivot and the second actuator pivot.

2. The split shaft assembly of claim 1, wherein:
said first shaft unit has a boss;
said second shaft unit has a flange; and
said vibration control material separates said flange from said boss.

3. The split shaft assembly of claim 2, wherein:
said first shaft unit includes a shoulder which said boss extends beyond and against which said flange of said second shaft unit abuts, wherein said vibration control material also extends between said flange and said shoulder.

4. The split shaft assembly of claim 1, further comprising:
a post having a first end and a second end; and wherein:
 said first shaft unit has a first recess receiving said first end of said post and said vibration control material separates said first shaft unit from said post; and
 said second shaft unit has a second recess receiving said second end of said post and said vibration control material also separates said second shaft unit from said post.

5. The split shaft assembly of claim 4, wherein:
said first shaft unit includes a first bushing proximate to where said first recess receives said post;
said second shaft unit includes a second bushing proximate to where said second recess receives said post; and
said vibration control material also separates said first bushing from said second bushing, to strengthen said axial aligning of said second shaft unit with said first shaft unit along said common pivot axis.

6. The split shaft assembly of claim 4, wherein:
at least one of said first shaft unit and said second shaft unit are hollow, thereby forming at least one of said first recess and said second recess.

7. The split shaft assembly of claim 6, wherein:
both said first shaft unit and said second shaft unit are hollow, thereby forming both said first recess and said second recess;
said first end of said post extends through said first recess substantially the entire length of said first shaft unit and defines a first region between said first shaft unit and said post;
said second end of said post extends through said second recess substantially the entire length of said second shaft unit and defines a second region between said second shaft unit and said post;
said vibration control material is present in substantially all of said first region and said second region, to strengthen said axial alignment of said second shaft unit with said first shaft unit along said common pivot axis and to more strongly interrupt said transmission of vibrational force between the first actuator pivot and the second actuator pivot.

8. The split shaft assembly of claim 7, wherein:
said first shaft unit includes a first bushing proximate to where said first recess receives said post;
said second shaft unit includes a second bushing proximate to where said second recess receives said post; and said vibration control material also separates said first bushing from said second bushing, to strengthen said axial aligning of said second shaft unit with said first shaft unit along said common pivot axis.

9. The split shaft assembly of claim 1, further comprising:

a spacer having a first opening and a second opening which are coaxial, wherein said spacer is made of said vibration control material;

and wherein:

said first shaft unit has a first end extending past the first actuator pivot;

said second shaft unit has a second end extending past the second actuator pivot; and said first end is nested into said first opening of said spacer and said second end is nested into said second opening of said spacer and said first end is separated from contacting said second end by the presence of said spacer.

10. The split shaft assembly of claim 9, wherein:

said spacer has a first side adjacent said first opening and a second side adjacent said second opening;

said first side of said spacer abuts against the first actuator pivot; and said second side of said spacer abuts against the second actuator pivot.

11. The split shaft assembly of claim 10, wherein:

at least one of the first actuator pivot and the second actuator pivot include a bearing race which said spacer abuts against.

12. The split shaft assembly of claim 10, wherein:

at least one of said first shaft unit and said shaft unit include a flange which said spacer abuts against.

13. The split shaft assembly of claim 1, wherein:

said first shaft unit has a first end and a first concentric bushing;

said second shaft unit has a second end and a second concentric bushing;

said first concentric bushing and said second concentric bushing are axially offset and inter-nestingly engaged along said common pivot axis, wherein said vibration control material separates said first end of said first shaft unit from said second concentric bushing and said second concentric bushing from first concentric bushing.

14. The split shaft assembly of claim 13, wherein:

said vibration control material also extends between said first end of said first shaft unit and said second end of said second shaft unit.

15. The split shaft assembly of claim 1, wherein:

said first shaft unit has a first end including a first flange;

said second shaft unit has a second end including a second flange;

said vibration control material has adhesive properties; and said first flange and said second flange are adhesively engaged by said vibration control material.

16. The split shaft assembly of claim 1, wherein:

said vibration control material has at least one member of the set consisting of vibration isolating characteristics and vibration dampening characteristics.

17. The split shaft assembly of claim 1, wherein:

the disk storage device is a magnetic disk drive;

the first actuator is a seeking actuator; and the second actuator is a tracking actuator.

* * * * *